United States Patent
Akiyama et al.

(10) Patent No.: US 10,119,855 B2
(45) Date of Patent: Nov. 6, 2018

(54) CAPACITANCE TYPE TRANSDUCER

(71) Applicant: CANON KABUSHIKI KAISHA, Tokyo (JP)

(72) Inventors: Takahiro Akiyama, Los Angeles, CA (US); Kazutoshi Torashima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/645,518

(22) Filed: Jul. 10, 2017

(65) Prior Publication Data

US 2017/0307438 A1  Oct. 26, 2017

Related U.S. Application Data

(62) Division of application No. 14/511,365, filed on Oct. 10, 2014, now Pat. No. 9,752,924.

(30) Foreign Application Priority Data

Oct. 22, 2013 (JP) .................................. 2013-218822

(51) Int. Cl.
  *B06B 1/02* (2006.01)
  *G01H 11/06* (2006.01)
  *G01H 9/00* (2006.01)

(52) U.S. Cl.
  CPC ........... *G01H 9/008* (2013.01); *B06B 1/0292* (2013.01); *G01H 11/06* (2013.01)

(58) Field of Classification Search
  CPC ....... G01H 9/008; G01H 11/06; B06B 1/0292
  (Continued)

(56) References Cited

U.S. PATENT DOCUMENTS 6,504,387 B1 * 1/2003 Shail .................... G01D 5/2405
                                                         324/658
7,944,114 B2    5/2011 Yoshimura et al.
(Continued)

FOREIGN PATENT DOCUMENTS

JP    2008-283618 A    11/2008
JP    2010-272956 A    12/2010
(Continued)

OTHER PUBLICATIONS

Notification of Reasons for Refusal in Japanese Application No. 2013-218822 (dated Nov. 30, 2017).

*Primary Examiner* — J M Saint Surin
(74) *Attorney, Agent, or Firm* — Fitzpatrick, Cella, Harper & Scinto

(57) ABSTRACT

A capacitance type transducer includes a plurality of cells each having a structure in which a vibrating film is supposed so as to be vibrated. The vibrating film includes: a second electrode formed so that a gap is interposed between the second electrode and a first electrode; and an insulating film formed on the second electrode. The capacitance transducer manufacturing method includes: forming a sacrificial layer on the first electrode; forming a layer including a vibrating film on the sacrificial layer; forming an etching hole to remove the sacrificial layer; and forming a sealing film for sealing the etching hole. Before forming the etching hole to remove the sacrificial layer, a through hole is formed in an insulating film on the second electrode, and a conductor film is formed on the insulating film having the through hole to electrically connect a conductor in the through hole and the second electrode.

11 Claims, 4 Drawing Sheets

(58) Field of Classification Search
USPC .......................................................... 73/632
See application file for complete search history.

(56) References Cited

U.S. PATENT DOCUMENTS

| | | | |
|---|---|---|---|
| 8,426,235 B2 | 4/2013 | Chang | |
| 8,518,733 B2 | 8/2013 | Kato et al. | |
| 8,653,613 B2 * | 2/2014 | Torashima | B81C 1/00158 |
| | | | 257/419 |
| 8,760,035 B2 | 6/2014 | Tomiyoshi et al. | |
| 8,767,278 B2 | 7/2014 | Torashima et al. | |
| 8,875,583 B2 | 11/2014 | Torashima et al. | |
| 9,073,085 B2 | 7/2015 | Kandori et al. | |
| 9,497,552 B2 * | 11/2016 | Akiyama | H04R 19/013 |
| 9,510,069 B2 | 11/2016 | Tomiyoshi et al. | |
| 2011/0169510 A1 | 7/2011 | Kandori et al. | |
| 2011/0305822 A1 | 12/2011 | Hasegawa et al. | |
| 2012/0256518 A1 * | 10/2012 | Torashima | B06B 1/0292 |
| | | | 310/300 |
| 2013/0049527 A1 * | 2/2013 | Hasegawa | H01G 5/16 |
| | | | 310/300 |
| 2013/0069480 A1 | 3/2013 | Akiyama et al. | |
| 2014/0007693 A1 | 1/2014 | Torashima et al. | |
| 2014/0010052 A1 | 1/2014 | Torashima et al. | |
| 2014/0010388 A1 | 1/2014 | Akiyama et al. | |
| 2014/0318255 A1 | 10/2014 | Torashima et al. | |
| 2015/0057547 A1 | 2/2015 | Torashima et al. | |

FOREIGN PATENT DOCUMENTS

| | | |
|---|---|---|
| JP | 2011-234061 A | 11/2011 |
| JP | 2011-259371 A | 12/2011 |
| JP | 2012-222514 A | 11/2012 |
| JP | 2012-222785 A | 11/2012 |
| WO | 2013/073374 A1 | 5/2013 |
| WO | 2013/111040 A1 | 8/2013 |

* cited by examiner

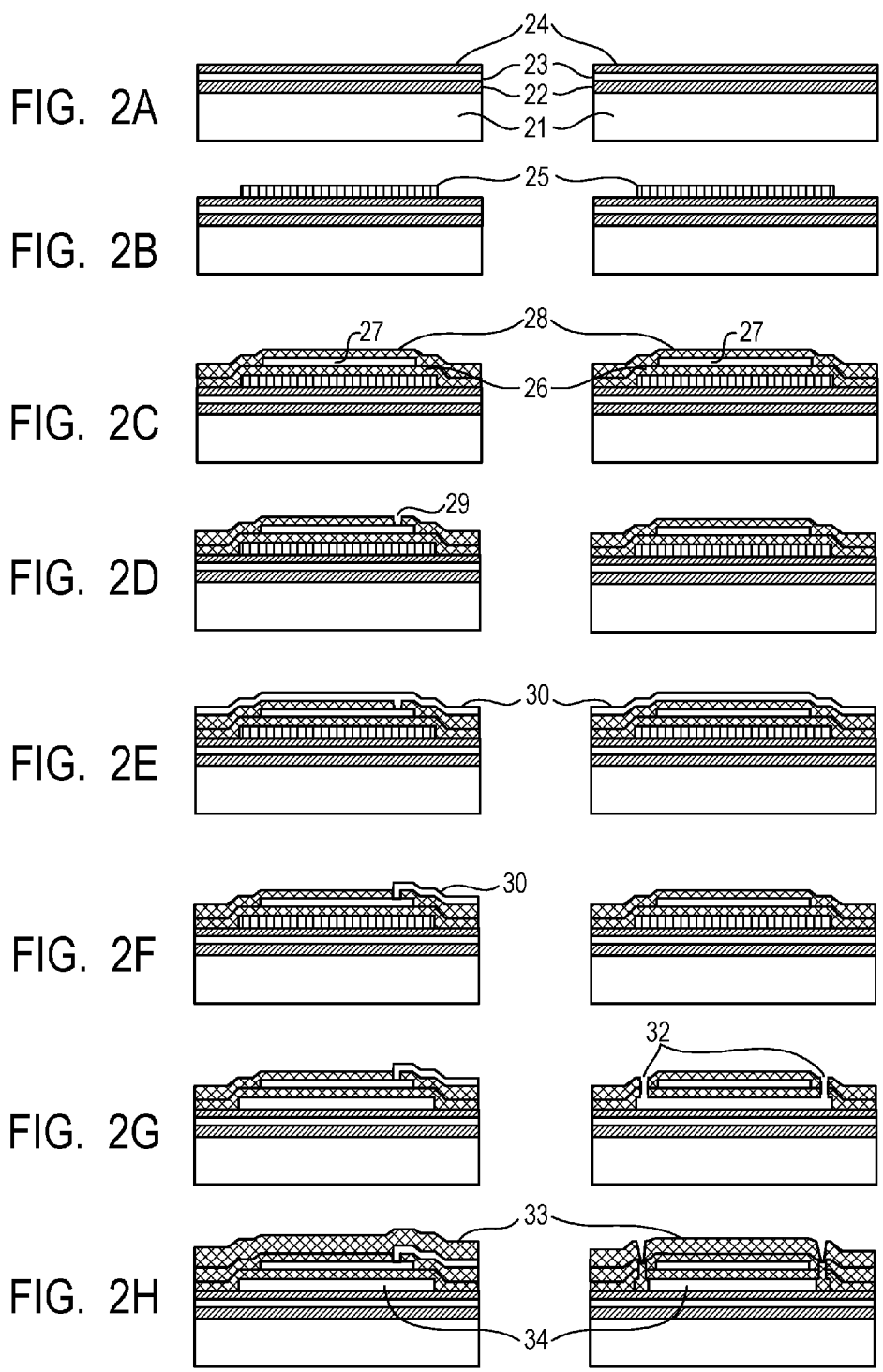

CAPACITANCE TYPE TRANSDUCER

CROSS-REFERENCE TO RELATED APPLICATIONS

This application is a divisional application of U.S. patent application Ser. No. 14/511,365, filed Oct. 10, 2014, which claims the benefit of Japanese Patent Application No. 2013-218822, filed Oct. 22, 2013. All prior applications are hereby incorporated by reference herein in their entirety.

BACKGROUND OF THE INVENTION

Field of the Invention

The present invention relates to a capacitance type transducer to be used as an ultrasound transducer or the like, and a method of manufacturing the capacitance type transducer.

Description of the Related Art

Hitherto, micromechanical members to be manufactured using micromachining technology may be processed on the order of micrometers, and various functional microelements are realized using such micromechanical members. A capacitance type transducer using such technology is being researched as an alternative to a piezoelectric element. With such a capacitance type transducer, an acoustic wave such as an ultrasound wave (hereinafter sometimes represented by ultrasound wave) may be transmitted and received using vibrations of a vibrating film, and in particular, excellent broadband characteristics in a liquid may be obtained with ease. It is to be noted that the term "acoustic wave" as employed herein encompasses waves called a sonic wave, an ultrasound wave, and a photoacoustic wave. For example, the term "acoustic wave" encompasses a photoacoustic wave generated in an object when the inside of the object is irradiated with light (electromagnetic wave) such as visible light or infrared light.

Regarding the above-mentioned technology, there has been proposed a capacitance type transducer in which a parasitic capacitance is reduced by extracting wiring from an upper electrode embedded in a membrane on an upper side of the membrane (see Japanese Patent Application Laid-Open No. 2011-234061). Further, there has been proposed a capacitance type transducer in which through wiring is provided in a membrane so as to reduce fatigue caused by a stress of an upper electrode embedded in the membrane (see Japanese Patent Application Laid-Open No. 2008-283618).

In the case of manufacturing a broadband capacitance type transducer with a high-output acoustic pressure, a high-efficiency capacitance type transducer can be obtained by setting a distance between electrodes to be small. However, with such a configuration, there arises a problem of a reduction in withstand voltage, which limits a voltage to be applied, with the result that it is not easy to produce a large acoustic pressure. On the other hand, a broadband can be achieved if the mass of a vibrating film is lowered by using a thin membrane as the vibrating film. However, according to a related-art manufacturing method involving sealing a gap after forming an upper electrode, the thickness of the vibrating film fluctuates and the fluctuations in gap are caused by warping, with the result that it is not easy to manufacture a high-performance device. Further, according to a method involving forming a hole in a sealing film to conduct electricity with though wiring, it is not easy to form a thin film although the withstand voltage is ensured, and a band is likely to be narrow.

SUMMARY OF THE INVENTION

In view of the above-mentioned problems, according to one aspect of the present invention, there is provided a method of manufacturing a capacitance type transducer including a plurality of cells each having a structure in which a vibrating film is supported so as to be vibrated, the vibrating film including: a second electrode formed so that a gap is interposed between the second electrode and a first electrode; and an insulating film formed on the second electrode, the method including the following steps. That is, the method includes: forming a sacrificial layer on the first electrode; forming a layer including the vibrating film on the sacrificial layer; forming an etching hole to remove the sacrificial layer; and forming a sealing film configured to seal the etching hole. Then, the method further includes, before the forming an etching hole to remove the sacrificial layer: forming a through hole in the insulating film on the second electrode; and forming a conductor film on the insulating film including the through hole to electrically connect a conductor in the through hole and the second electrode to each other.

Further, in view of the above-mentioned problems, according to another aspect of the present invention, there is provided a capacitance type transducer including a plurality of cells each having a structure in which a vibrating film is supported so as to be vibrated, the vibrating film including: a second electrode formed so that a gap is interposed between the second electrode and a first electrode; and an insulating film formed on the second electrode. Further, the second electrode and a conductor film on the insulating film are electrically connected to each other via a conductor in a through hole formed in the insulating film on the second electrode.

Further features of the present invention will become apparent from the following description of exemplary embodiments with reference to the attached drawings.

BRIEF DESCRIPTION OF THE DRAWINGS

FIGS. 2A, 2B, 2C, 2D, 2E, 2F, 2G and 2H are sectional views illustrating an example of a transducer manufacturing method of the present invention.

DESCRIPTION OF THE EMBODIMENTS

Preferred embodiments of the present invention will now be described in detail in accordance with the accompanying drawings.

A typical example of a capacitance type transducer manufacturing method of the present invention includes, before forming an etching hole to remove a sacrificial layer, forming a through hole in an insulating film on a second electrode and forming a conductor film on the insulating film having the through hole to electrically connect a conductor in the through hole and the second electrode to each other. In such a capacitance type transducer, the conductor film on the insulating film and an appropriate number of second electrodes can be electrically connected to each other via the conductor in the through hole formed in the insulating film on the second electrode. Thus, the setting of a distance between electrodes in end portions of a vibrating film is prevented from being limited by being influenced by a distance between the first and second electrodes interposing a gap therebetween. Then, the transmitting/receiving sensitivity influenced by the distance between the first and second electrodes and the withstand voltage influenced by the distance between the electrodes in the end portions of the vibrating film can be both achieved satisfactorily. Embodiments of the present invention are hereinafter described based on the above-mentioned concept. However, the present invention is not limited to those embodiments, and the embodiments can be variously modified and changed in a range not departing from the spirit of the present invention.

Figure 1A:
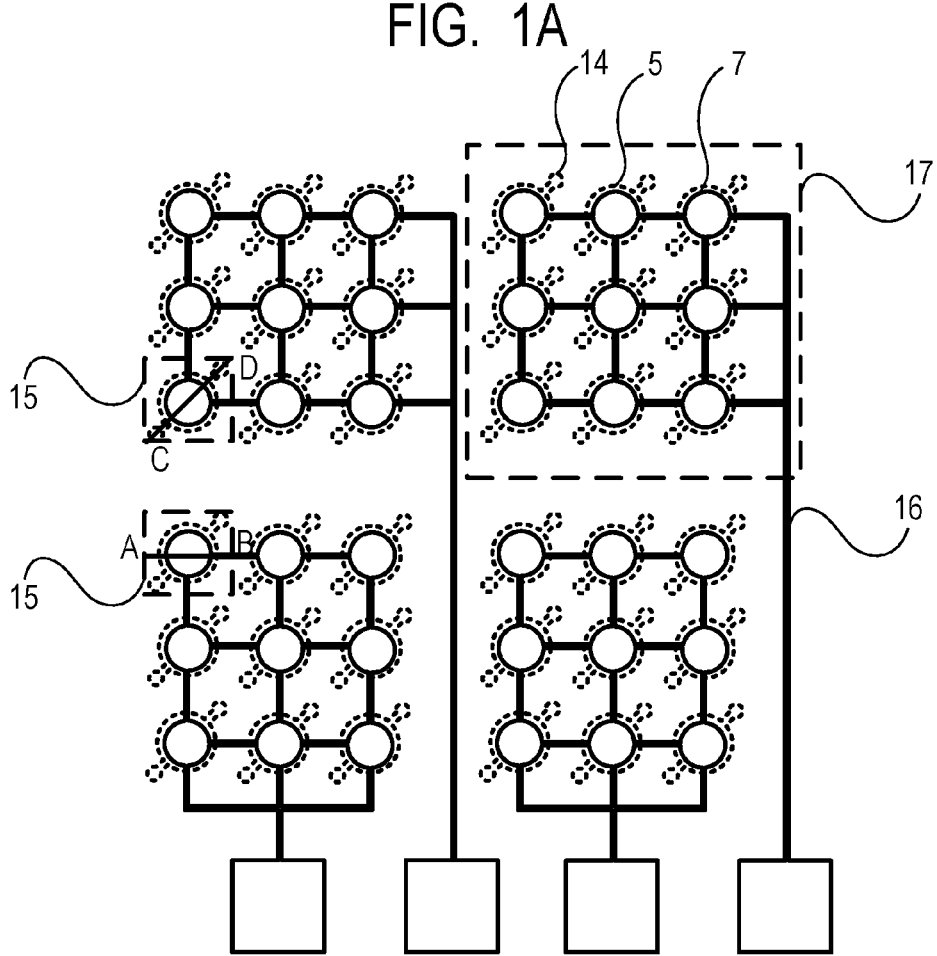
FIGS. 1A and 1B are views illustrating an example of a capacitance type transducer of the present invention.
Figure 1B:
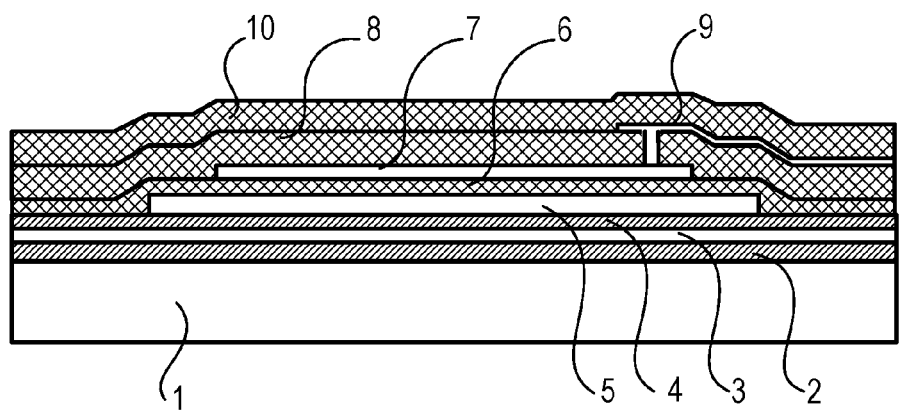

Referring to the accompanying drawings, embodiments of the present invention are described below. FIG. 1A is a top view illustrating an example of a capacitance type transducer manufactured by a manufacturing method according to the present invention, and FIG. 1B is a sectional view taken along the line A-B of FIG. 1A. FIGS. 2A to 2H are sectional views (see left side) taken along the line A-B of FIG. 1A and sectional views (see right side) taken along the line C-D of FIG. 1A, illustrating a capacitance type transducer manufacturing method of this embodiment.

The capacitance type transducer manufactured by the manufacturing method of this embodiment includes an element 17 including a plurality of cells 15. In FIG. 1A, each element 17 includes nine cells 15, but any number of the cells 15 can be included in each element 17. Further, the capacitance type transducer of FIG. 1A includes four elements 17, but any number of the elements 17 may be included in the capacitance type transducer. The cells 15 are arranged in a square lattice with an equal interval, but the cells 15 may be arranged in a hexagonal close-packed lattice or arranged with a non-equal interval.

As illustrated in FIG. 1B, in the structure of the cell 15, a vibrating film is supported so as to be vibrated. The vibrating film including a second electrode 7 is provided so that a gap 5 (void, etc.) is interposed between the second electrode 7 and a first electrode 3. In this case, the vibrating film includes a first membrane 6 right above the gap 5, a second membrane 8, the second electrode 7, a conductor film 9, and a sealing film 10. The first electrode 3 or the second electrode 7 is used as an electrode for applying a bias voltage or an electrode for applying an electric signal or extracting an electric signal. In the configuration of FIG. 1B, the first electrode 3 is used as the electrode for applying a bias voltage, and the second electrode 7 is used as the electrode for extracting an electric signal. However, the first electrode 3 may be used as the electrode for extracting an electric signal, and the second electrode 7 may be used as the electrode for applying a bias voltage. Electrodes for applying a bias voltage are electrically connected to each other in each element 17 to be shared. A bias voltage may be shared by a plurality of the elements 17, whereas a signal extraction electrode needs to be electrically isolated on an element basis.

The drive principle of the capacitance type transducer is described. The capacitance type transducer can extract an electric signal from the second electrode 7 through use of signal extraction wiring 16. In this embodiment, although the signal extraction wiring 16 extracts an electric signal, if a substrate 1 is a through wiring substrate, an electric signal can also be extracted to the back side of the substrate 1 by using through wiring passing through the front and back sides of the substrate 1. Further, in this embodiment, although the second electrode 7 extracts an electric signal, an electric signal may be extracted from the first electrode 3 as described above.

In the case where the capacitance type transducer receives an ultrasound wave, a potential difference is generated between the first electrode 3 and the second electrode 7 with a voltage application unit (not shown). When the capacitance type transducer receives an ultrasound wave, the vibrating film including the second electrode 7 is vibrated, and hence a capacitance of the element 17 changes. Owing to the change in capacitance, an AC current flows through the signal extraction wiring 16. The ultrasound wave is converted into an electric signal as described above, and hence the capacitance type transducer can receive the ultrasound wave. As described above, the configuration of the signal extraction wiring 16 may be changed so as to apply a DC voltage to the second electrode 7 to extract an electric signal from the first electrode 3. On the other hand, when an AC voltage is applied to the second electrode 7, the vibrating film is vibrated due to a change in electrostatic force with time. The vibration of the vibrating film is tens of kilohertz to tens of megahertz, which falls in a frequency band of an ultrasound wave. A material on the vibrating film is directly vibrated. This is the principle of generating an ultrasound wave. When the electric signal is converted into an ultrasound wave as described above, the ultrasound wave can be transmitted. In the same way as in the case of receiving an ultrasound wave, the configuration of the signal extraction wiring 16 may be changed so as to apply an AC voltage to the first electrode 3 to vibrate the vibrating film in the case of transmitting the ultrasound wave.

A manufacturing method of this embodiment is described. FIGS. 2A to 2H are sectional views taken along the lines A-B and C-D of FIG. 1A. As illustrated in FIG. 2A, an insulating film 22 (corresponding to an insulating film 2 of FIG. 1B) is formed on a substrate 21. As the substrate 21, for example, there are given a monocrystalline silicon substrate, a sapphire substrate, and a glass substrate. The insulating film 22 is formed for insulating the substrate 21 from a first electrode. In the case where the substrate 21 is made of an insulator, the insulating film 22 is not always required to be formed. The substrate 21 is required to have a high flatness. If the surface roughness of the substrate 21 is large, the surface roughness is transferred in a later step, and the distance between the first electrode and the second electrode fluctuates among cells and elements because of the surface roughness. The fluctuations in distance are responsible for the fluctuations in transmitting/receiving sensitivity. It is therefore desired that the substrate 21 have a small surface roughness.

Next, a first electrode 23 is formed. It is desired that the first electrode 23 be made of a material having a small surface roughness and a high conductivity. Simultaneously, the first electrode 23 is also required to be made of a material that is not likely to degrade with heat in a later film-formation step. Examples of the material include titanium and an alloy thereof, aluminum alloys such as Al—Si—Cu and Al—Cu, and a multi-layered conductor film using those materials as a barrier. If the first electrode 23 has a large surface roughness, the distance between the first electrode 23 and a second electrode fluctuates among the cells and elements because of the surface roughness. Thus, similarly to the substrate 21, a conductive material having a small surface roughness is desired. Next, an insulating film 24 (corresponding to an insulating film 4 of FIG. 1B) is formed on the first electrode 23. It is desired that the insulating film 24 on the first electrode 23 be made of an insulating material having a small surface roughness. The insulating film 24 is formed in order to prevent an electrical short circuit or a dielectric breakdown between the first electrode 23 and the second electrode caused when a voltage is applied therebetween. Further, in an etching step of a sacrificial layer described later, in the case where an etch selectivity of the materials for the sacrificial layer and the first electrode 23 is small, the insulating film 24 may be formed as a protective film so as to protect the first electrode 23. If the insulating film 24 has a large surface roughness, the distance between the first electrode 23 and the second electrode fluctuates among the cells and elements because of the surface roughness. Thus, similarly to the substrate 21, the insulating film 24 having a small surface roughness is desired. The insulating film 24 is, for example, a silicon nitride film or a silicon oxide film.

As illustrated in FIG. 2B, a sacrificial layer 25 is formed. It is desired that the sacrificial layer 25 be made of a material having a small surface roughness. If the sacrificial layer 25 has a large surface roughness, the distance between the first electrode 23 and the second electrode fluctuates among the cells and elements because of the surface roughness. Thus, similarly to the substrate 21, the sacrificial layer 25 having a small surface roughness is desired. Considering the later etching step of the sacrificial layer 25, it is required for a material for the sacrificial layer 25 to satisfy a condition under which an etch selectivity with respect to the surrounding material is close to an infinite. In the case where the insulating film 24 on the first electrode 23 and a first membrane layer described later are made of a silicon nitride film or a silicon oxide film, chromium, molybdenum, or amorphous silicon that has a small surface roughness and can take a selection ratio with respect to the insulating film 24 on the first electrode 23 and the first membrane layer is desired as the material for the sacrificial layer 25.

As illustrated in FIG. 2C, a first insulating film 26 including the first membrane 6 is formed on the sacrificial layer 25. It is desired that the first insulating film 26 have a low tensile stress of, for example, 300 MPa or less. A material mainly including a silicon nitride film capable of being controlled for a stress is desired. In the case where the first membrane 6 has a compressive stress, the first membrane 6 causes sticking or buckling to be greatly deformed. Sticking refers to that a vibrating film serving as a structure adheres to the insulating film 24 after the removal of the sacrificial layer 25. Further, in the case where the first insulating film 26 has a large tensile stress, the first membrane 6 may be broken. Thus, it is desired that the first insulating film 26 have a low tensile stress.

Next, a second electrode 27 is formed. It is desired that the second electrode 27 be made of a material having a small residual stress and heat resistance. In the case where the second electrode 27 has a large residual stress, the vibrating film is greatly deformed, and hence the second electrode 27 desirably has a small residual stress. Further, it is desired that the second electrode 27 be made of a material that does not cause degradation and an increase in stress depending on the temperature at a time when a second insulating film including the second membrane 8 or a sealing film for forming a sealing portion described later is formed. The second electrode 27 cannot be formed thick for the same reason, and hence is required to have a high conductivity. As the material for the second electrode 27, for example, titanium, an aluminum silicon alloy, or the like is desired. Subsequently, a second insulating film 28 including the second membrane 8 is formed. It is desired that the second insulating film be made of a material having a low tensile stress. Similarly to the first insulating film 26, if the second insulating film 28 has a compressive stress, the vibrating film causes sticking or buckling to be greatly deformed. Further, in the case where the second insulating film 28 has a large tensile stress, the vibrating film may be broken. Thus, it is desired that the second insulating film 28 have a low tensile stress. A material mainly including a silicon nitride film capable of being controlled for a stress is desired.

As illustrated in FIG. 2D, a contact hole 29 serving as the through hole is formed in the second insulating film 28, and the second electrode 27 on the sacrificial layer 25 is partially exposed. The second electrode 27 is not supposed to be etched at this time, and hence an etching method needs to have a selection ratio with respect to the material for the second electrode 27. If the material for the second electrode 27 is titanium, for example, the contact hole 29 for partially exposing the second electrode 27 can be formed by etching using fluorocarbon gas.

Next, as illustrated in FIG. 2E, a conductor film 30 is formed. The conductor film 30 is removed except for a part thereof in a step of FIG. 2F to become a wiring portion that is electrically connected to the second electrodes 27 of the cells 15 so as to connect the second electrodes 27 to each other. The conductor film 30 is required to have a high conductivity and heat resistance in a later sealing step. For example, the conductor film 30 is desirably a titanium film or a stacked film having a titanium layer; an aluminum film or a stacked film including an aluminum layer; or an alloy film containing titanium and/or aluminum.

As illustrated in FIG. 2G, an etching hole 32 (which is located in a sealing portion 14 of FIG. 1A) is formed. The etching hole 32 serves to introduce an etchant or etching gas so as to remove the sacrificial layer 25. After that, the sacrificial layer 25 is removed to form a gap 34. A method of removing the sacrificial layer 25 may be wet etching or dry etching. In the case of using chromium as the material for the sacrificial layer 25, wet etching is preferred.

Next, as illustrated in FIG. 2H, in order to seal the etching hole 32, a sealing film 33 is formed. It is required that neither liquid nor outside air enter the gap 34. When the inside of the gap 34 is at an atmospheric pressure, the gas in the gap 34 expands or contracts depending on a change in temperature in some cases. Further, a high electric field is applied to the gap 34, and hence a degradation in reliability of an element may occur by ionization of molecules. Therefore, the sealing is required to be conducted under a reduced pressure. By reducing the pressure in the gap 34, the resistance of the gas in the gap 34 can be reduced. Accordingly, the vibrating film is easily vibrated, and the sensitivity of the capacitance type transducer can be enhanced. Further, owing to the sealing, the capacitance type transducer can be used in a liquid. It is desired that the material for the sealing film 33 be the same as that for the vibrating film (that is, the second insulating film 28 on the second electrode 27) because the adhesion of the sealing film 33 with respect to the vibrating film is high. In the case where the vibrating film is made of silicon nitride, it is desired that the sealing film 33 be made of silicon nitride similarly.

According to the manufacturing method of this embodiment, the wiring for connecting the cells, which has been formed to pass between the first membrane 6 and the second membrane 8, is allowed to pass through an upper side of the second membrane 8. Accordingly, a capacitance type transducer having a high withstand voltage can be provided.

More specifically, by connecting the embedded upper electrode and the conductor film 30 to form a part of the conductor film 30 as wiring before etching the sacrificial layer 25, an electrode of the vibrating film can be formed without changing the distance between the first electrode 23 and the second electrode 27. The withstand voltage of the capacitance type transducer is determined by the electric field intensity between the upper and lower electrodes in a step difference portion in the end portions of the vibrating film. Thus, according to this embodiment, a capacitance type transducer can be provided in which the distance between the upper and lower electrodes in the end portions of the vibrating film can be enlarged without changing the distance between the upper and lower electrodes of a cavity (gap) portion, and the withstand voltage is enhanced while keeping transmitting/receiving sensitivity.

Now, the present invention is described in detail by way of more specific embodiments.

(First Embodiment) (Increase in Withstand Voltage)

A first embodiment of the present invention is described with reference to FIGS. 2A to 2H. In the step of FIG. 2A, the insulating film 22 on the monocrystalline silicon substrate 21 is a silicon oxide film having a thickness of about 1 μm formed by thermal oxidation. The first electrode 23 is a metal film having a thickness of from 0.05 μm to 0.20 μm, and is formed by electron beam deposition or sputtering. The material for the first electrode 23 is aluminum, titanium, or an alloy and a multi-layered film thereof. Although not shown, as needed, the first electrode 23 is patterned. The insulating film 24 on the first electrode 23 is a silicon oxide film formed by plasma enhanced chemical vapor deposition (PE-CVD) and has a thickness of from 0.1 μm to 0.3 μm.

The step of FIG. 2B is described. The sacrificial layer 25 is made of chromium and is formed by electron beam deposition or sputtering. The sacrificial layer 25 has a thickness of from 0.1 μm to 0.3 μm. The sacrificial layer 25 is patterned into a circular shape to serve as the gap 5 of FIGS. 1A and 1B after the step of removing the sacrificial layer 25 described later. The step of FIG. 2C is described. The insulating film 26 serving as the first membrane 6 in FIG. 1B is formed. The insulating film 26 is a silicon nitride film formed by PE-CVD and has a thickness of from 0.3 μm to 0.6 μm. Next, the second electrode 27 is formed. The second electrode 27 is made of aluminum, titanium, or an alloy and a multi-layered film thereof and is formed by electron beam deposition or sputtering. The second electrode 27 has a thickness of from 0.1 μm to 0.2 μm. Subsequently, the second insulating film 28 serving as the second membrane 8 in FIG. 1B is formed. The second insulating film 28 is a silicon nitride film formed by PE-CVD and has a thickness of from 0.3 μm to 0.6 μm.

The step of FIG. 2D is described. A hole is formed in the insulating film 28 to form the contact hole 29. The silicon nitride film is removed by dry etching using reactive ion etching (RIE) or chemical dry etching (CDE). The step of FIG. 2E is described. The conductor film 30 is formed. The conductor film 30 is made of aluminum, titanium, or an alloy and a multi-layered film thereof. The conductive film 30 has a thickness of from 0.1 μm to 0.2 μm. The step of FIG. 2F is described. The conductive film 30 is etched by photolithography and wet etching to form a pattern, and thus the conductor film 9 for connecting the second electrodes 7 of the cells 15 determined appropriately in FIGS. 1A and 1B is formed. In this case, a portion to be supplied with a maximum electric field when a potential difference is generated between the first electrode 3 and the second electrode 7 corresponds to a portion having a total thickness of the insulating film 4 and the insulating film 6, and the insulating film 8 as well. Thus, this structure can obtain a withstand voltage by the thickness of the insulating film 8, compared to the related-art configuration.

The step of FIG. 2G is described. The etching hole 32 is formed in the insulating film 26 and the insulating film 28. The silicon nitride film is removed by RIE or CDE. Then, the sacrificial layer 25 is removed. The chromium is removed by wet etching. Ceric ammonium nitrate serving as an etchant of chromium hardly etches silicon nitride, silicon oxide, or titanium, and hence the thickness of the films forming the cell 15 hardly changes.

The step of FIG. 2H is described. The sealing film 33 is formed. The sealing film 33 is a silicon nitride film formed by PE-CVD and has a thickness of from 0.4 μm to 0.7 μm. This step is performed under a reduced pressure, and hence the gap 34 has a pressure of 300 Pa or less that is sufficiently smaller than the atmospheric pressure.

Although not shown, in order to conduct electricity with respect to the first electrode 23 and the second electrode 27 or the conductor film 30, the sealing film 33 and the insulating films 24, 26, and 28 are removed by dry etching to expose a metal film. After that, a metal film made of aluminum or the like is formed in a portion to be electrically connected in a later step such as wire bonding.

The capacitance type transducer manufacturing method of this embodiment can provide a capacitance type transducer having a withstand voltage higher than that of the related art by including the step of forming the conductor film 30. Similarly, such a design that an output acoustic pressure is increased can be obtained by enlarging the gap 34 and applying a large voltage thereto.

(Second Embodiment) (Etch Stop Film and Increase in Band Through Thickness Reduction)

A capacitance type transducer manufacturing method according to a second embodiment of the present invention is described with reference to FIGS. 3A to 3E. FIGS. 3A to 3E are views illustrating the manufacturing method of this embodiment. The step prior to FIG. 3A corresponds to the step of FIG. 2E, and the process up to this step is the same as that of the first embodiment. Further, a top view of a capacitance type transducer manufactured in this embodiment is the same as that of FIG. 1A, but a sectional view thereof is partially different from that of FIG. 1B, in which the sealing film 10 above the gap 5 is removed.

Figure 3A:
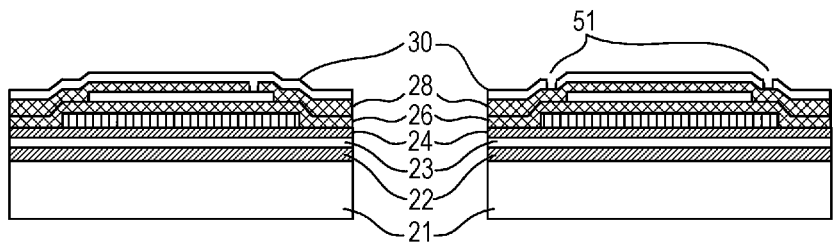
FIGS. 3A, 3B, 3C, 3D and 3E are sectional views illustrating another example of the transducer manufacturing method of the present invention.
Figure 3B:
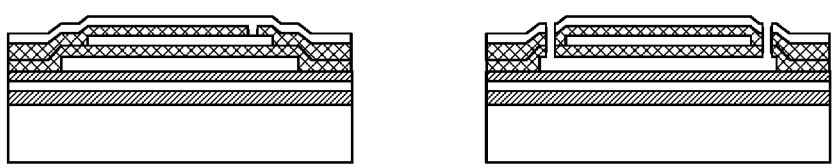

The step of FIG. 3A is described. A hole 51 for etching the sacrificial layer 25 is formed in the conductor film 30. The step of FIG. 3B is described. A hole is formed in the insulating film 26 and the insulating film 28. The silicon nitride film is removed by RIE or CDE. Then, the sacrificial layer 25 is removed. The chromium is removed by wet etching. Ceric ammonium nitrate serving as an etchant of chromium hardly etches silicon nitride, silicon oxide, or titanium, and hence the thickness of the films forming the cell 15 hardly changes.

Figure 3C:
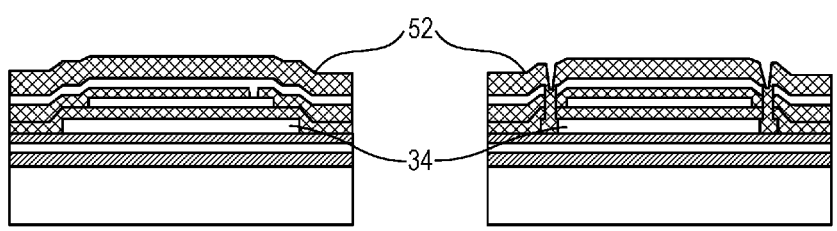
Figure 3D:
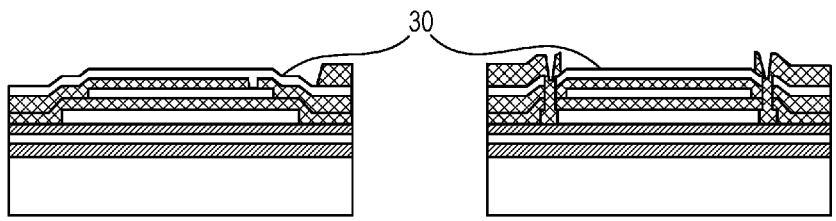

The step of FIG. 3C is described. A sealing film is formed. The sealing film 52 is a silicon nitride film formed by PE-CVD and has a thickness of from 0.4 μm to 0.7 μm. This step is performed under a reduced pressure, and hence the gap 34 has a pressure of 300 Pa or less that is sufficiently smaller than the atmospheric pressure. The step of FIG. 3D is described. The sealing film 52 is etched by RIE or CDE. That is, at least a part of a portion overlapping the gap in an orthographic projection of the sealing film 52 onto a first electrode side is removed up to the surface of an etch stop film. In this case, the conductor film 30 serves as the etch stop film and does not influence the structure on the substrate 21 side from the conductor film 30. Further, the conductor film 30 needs to be made of a material having a satisfactory selection ratio with respect to etching of the silicon nitride film serving as the sealing film 52. If the conductor film 30 is made of, for example, titanium, the selection ratio increases sufficiently and can serve as a conductor because titanium is a metal. The conductor film 30 serves as the etch stop film when the top surface thereof is made of titanium, and hence the conductor film 30 can also be made of a stacked film of Ti and Al or an alloy containing Ti.

Figure 3E:
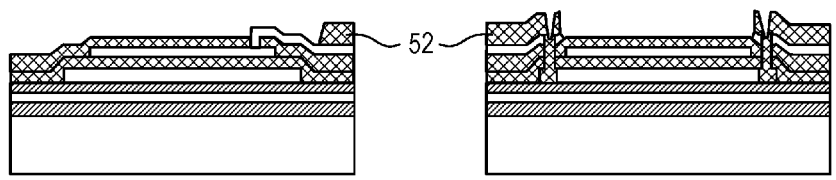

The step of FIG. 3E is described. The conductor film 30 is etched in an appropriate pattern by photolithography and wet etching to form a wiring layer for connecting the cells 15, and the remaining portion is removed. In the capacitance type transducer manufacturing method of this embodiment, the following effect is obtained in addition to the effects of the first embodiment. That is, the sealing film 52 above the gap is removed by using the conductive film 30 as the etch stop film, and thus a vibrating film can be formed of the first membrane 6, the second electrode 7, and the second membrane 8 substantially irrespective of the thickness required for sealing. The inertia of the vibrating film can be minimized (that is, the mechanical impedance can be reduced) by reducing the thickness of the vibrating film, and the frequency band of the capacitance type transducer can be enlarged. Thus, a high-output broadband capacitance type transducer having a high withstand voltage can be realized.

(Third Embodiment) (Object Information Acquiring Device)

An application example of an information acquiring device such as an ultrasound diagnosis apparatus including the transducer of the above-mentioned embodiment is described. The transducer receives an acoustic wave from an object and outputs an electric signal. Using the electric signal, object information that reflects an optical property value of the object, such as a light absorption coefficient, and object information that reflects the difference in acoustic impedance can be acquired. More specifically, in one embodiment of the object information acquiring device, the object is irradiated with light (electromagnetic wave including visible light and infrared light). Thus, photoacoustic waves generated at a plurality of positions (sites) in the object are received, and a characteristics distribution showing a distribution of characteristics information respectively corresponding to the plurality of positions in the object is acquired. The characteristics information to be acquired with the photoacoustic wave represents characteristics information related to the absorption of light and includes characteristics information that reflects an initial acoustic pressure of the photoacoustic wave generated by the irradiation of light, light energy absorption density and an absorption coefficient derived from the initial acoustic pressure, the concentration of a substance forming a tissue, and the like. Examples of the concentration of a substance include an oxygen saturation degree, a total hemoglobin concentration, and an oxyhemoglobin or deoxyhemoglobin concentration. Further, the object information acquiring device can also be used for diagnosing malignant tumors and blood diseases in humans and animals and monitoring chemical treatment. Thus, the objects targeted for diagnosis of the object information acquiring device are assumed to be the breasts, neck, abdomen, and the like of living organisms such as humans and animals. A light absorber in an object refers to a tissue having a relatively high absorption coefficient in the object. For example, in the case where a part of a human body is used as the object, examples of the light absorber include oxyhemoglobin, deoxyhemoglobin, or blood vessels containing a great amount thereof, a tumor containing a great number of new blood vessels, and plaque of a carotid wall. Further, a molecular probe that specifically binds to a malignant tumor through use of gold particles or graphite, a capsule for transmitting a drug, and the like also serve as the light absorber.

A distribution regarding acoustic characteristics in an object can also be acquired by receiving a reflection wave obtained from an ultrasound wave, which is transmitted from a probe including the transducer and reflected in the object, through an ultrasound echo, as well as by receiving a photoacoustic wave. The distribution of the acoustic characteristics includes a distribution that reflects a difference in acoustic impedance of tissues in the object. It is to be noted that it is not always necessary to acquire the distribution regarding transmitting/receiving characteristics and acoustic characteristics of an ultrasound wave.

Figure 4A:
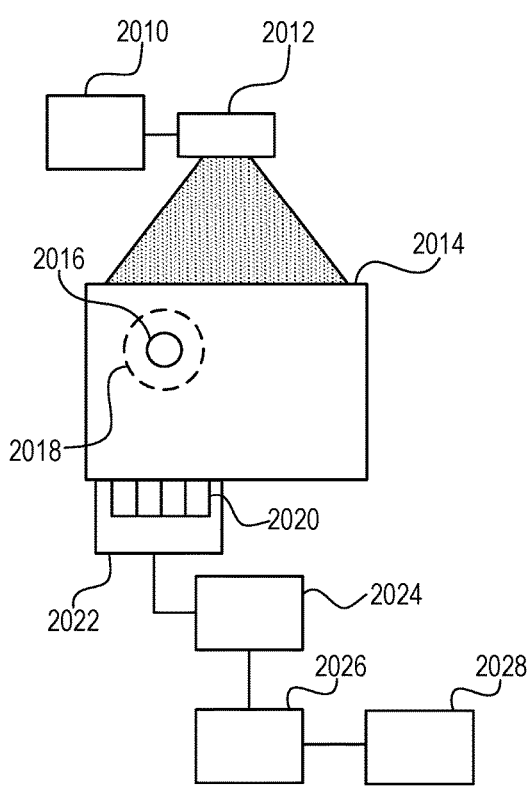
FIGS. 4A and 4B are views illustrating an example of an information acquiring device using the capacitance type transducer of the present invention.

FIG. 4A illustrates an object information acquiring device using a photoacoustic effect. Pulsed light emitted from a light source 2010 irradiates an object 2014 via an optical member 2012 such as a lens, a mirror, or an optical fiber. A light absorber 2016 inside the object 2014 absorbs energy of the pulsed light to generate a photoacoustic wave 2018 as an acoustic wave. A capacitance type transducer 2020 of the present invention in a probe 2022 receives the photoacoustic wave 2018 to convert the photoacoustic wave 2018 into an electric signal, and outputs the electric signal to a signal processor 2024. The signal processor 2024 subjects the input electric signal to signal processing such as A/D conversion and amplification, and outputs the resultant signal to a data processor 2026. The data processor 2026 uses the input signal to acquire object information (characteristics information that reflects an optical property value of the object, such as a light absorption coefficient) as image data. Here, the signal processor 2024 and the data processor 2026 are collectively referred to as a processor. A display unit 2028 displays an image based on the image data input from the data processor 2026. As described above, the object information acquiring device of this embodiment includes the capacitance type transducer of the present invention, the light source, and the processor. The transducer receives a photoacoustic wave generated when the light emitted from the light source irradiates the object and converts the photoacoustic wave into an electric signal, and the processor acquires the information on the object through use of the electric signal.

Figure 4B:
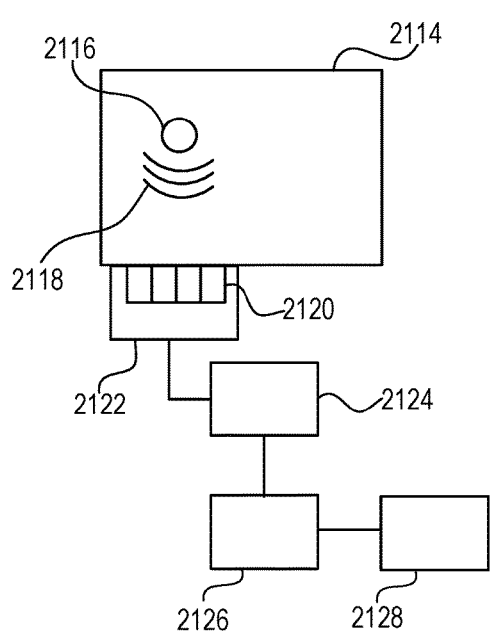

FIG. 4B illustrates an object information acquiring device such as an ultrasound echo diagnosis apparatus using the reflection of an acoustic wave. An acoustic wave transmitted from a capacitance type transducer 2120 of the present invention in a probe 2122 to an object 2114 is reflected by a reflector 2116. The transducer 2120 receives a reflected acoustic wave (reflected wave) 2118 to convert the reflected acoustic wave 2118 into an electric signal, and outputs the electric signal to a signal processor 2124. The signal processor 2124 subjects the input electric signal to signal processing such as A/D conversion and amplification and outputs the resultant signal to a data processor 2126. The data processor 2126 uses the input signal to acquire object information (characteristics information that reflects a difference in acoustic impedance) as image data. Here, the signal processor 2124 and the data processor 2126 are also collectively referred to as a processor. A display unit 2128 displays an image based on the image data input from the data processor 2126. As described above, the object information acquiring device of this embodiment includes the capacitance type transducer of the present invention, and the processor for acquiring the information on the object through use of the electric signal output from the transducer, and the transducer receives the acoustic wave from the object and outputs an electric signal.

It is to be noted that the probe may be configured to scan mechanically or may be configured to be moved by a user, such as a doctor or an engineer, relative to the object (handheld type). In the case of the object information acquiring device using a reflected wave as in FIG. 4B, a probe for transmitting an acoustic wave may be provided separately from a probe for receiving the acoustic wave. Further, the object information acquiring device may have both the functions of the devices of FIGS. 4A and 4B so as to acquire both the object information that reflects an optical property value of an object and object information that reflects a difference in acoustic impedance. In this case, the transducer 2020 of FIG. 4A may transmit an acoustic wave and receive a reflected wave instead of merely receiving a photoacoustic wave.

According to the present invention, the conductor film on the insulating film and the second electrode are electrically connected to each other via the conductor in the through hole formed in the insulating film on the second electrode. Thus, the capacitance type transducer can be realized, in which the setting of the distance between the electrodes in the end portions of the vibrating film is prevented from being limited by the distance between the first and second electrodes interposing the gap therebetween, and a balance between the transmitting/receiving sensitivity and the withstand voltage can be struck.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A capacitance type transducer, comprising a plurality of cells each having a structure in which a vibrating film is supported so as to be vibrated,
   the vibrating film comprising:
     a second electrode formed so that a gap is interposed between the second electrode and a first electrode; and
     an insulating film formed on the second electrode,
   wherein the second electrode and a conductor film on the insulating film are electrically connected to each other via a conductor in a through hole formed in the insulating film on the second electrode, and
   wherein the through hole is located above the gap.

2. The capacitance type transducer according to claim 1, wherein the gap is formed by removing a sacrificial layer, and
   wherein, on the insulating film on the second electrode, a sealing film configured to seal an etching hole used for removing the sacrificial layer is formed.

3. The capacitance type transducer according to claim 1, wherein the gap is formed by removing a sacrificial layer, and
   wherein, on the insulating film on the second electrode, except for at least a part of a portion overlapping the gap in an orthographic projection onto a first electrode side, a sealing film configured to seal an etching hole used for removing the sacrificial layer is formed.

4. An object information acquiring device, comprising:
   the capacitance type transducer according to claim 1; and
   a processor configured to acquire information on an object through use of an electric signal output from the capacitance type transducer,
   the capacitance type transducer being configured to receive an acoustic wave from the object and output the electric signal.

5. The object information acquiring device according to claim 4, further comprising a light source configured to emit light,
   wherein the capacitance type transducer receives the acoustic wave generated when the object is irradiated with the light emitted from the light source.

6. The capacitance type transducer according to claim 1, wherein the conductor film constitutes a wiring portion connecting second electrodes of the plurality of cells to each other.

7. The capacitance type transducer according to claim 1, wherein the conductor film includes aluminum, titanium, or an alloy and a multi-layered film thereof.

8. The capacitance type transducer according to claim 1, wherein the conductive film has a thickness of 0.1 μm to 0.2 μm.

9. The capacitance type transducer according to claim 1, wherein a material of the conductor in the through hole is the same as a material of the second electrode.

10. The capacitance type transducer according to claim 1, wherein an insulating film is formed on the conductor film.

11. The capacitance type transducer according to claim 10, wherein the insulating film is a sealing film to seal an etching hole used to form the gap.

* * * * *